United States Patent
Fink

[15] 3,689,014
[45] Sept. 5, 1972

[54] CAMMING STRAIN RELIEF BUSHING
[72] Inventor: Richard R. Fink, 31 Kinnan Way, Basking Ridge, N.J. 07920
[22] Filed: June 18, 1971
[21] Appl. No.: 154,350

Related U.S. Application Data

[63] Continuation-in-part of Ser. No. 15,674, March 3, 1970, abandoned.

[52] U.S. Cl. ............. 248/56, 174/153 G, 339/103 R
[51] Int. Cl. .............................. F16l 5/00, H02g 3/22
[58] Field of Search ...... 248/56; 16/2; 339/277 R, 103 R, 339/103 M; 174/153 G, 65 G

[56]  References Cited

UNITED STATES PATENTS

| | | | |
|---|---|---|---|
| 3,056,852 | 10/1962 | Sachs | 174/153 G |
| 3,123,662 | 3/1964 | Fink | 248/56 X |
| 3,240,502 | 3/1966 | Snyder | 248/56 X |
| 3,290,430 | 12/1966 | Klumpp | 174/153 G |
| 3,464,659 | 9/1969 | Klumpp | 248/66 |
| 3,493,205 | 2/1970 | Bromberg | 248/56 |
| 3,564,113 | 2/1971 | Kindler | 248/56 X |

FOREIGN PATENTS OR APPLICATIONS 334,947  9/1930  Great Britain ......... 339/103 B

*Primary Examiner*—Chancellor E. Harris
*Attorney*—Auslander & Thomas

[57]  ABSTRACT

An aperture locking strain relief bushing is provided with available pre-locking shank sections. Strain relief is obtained by the interaction of a cammed grip block moveably emplaced within the closed parts of the bushing.

46 Claims, 31 Drawing Figures

PATENTED SEP 5 1972 3,689,014

INVENTOR.
Richard R. Fink

BY Auslander Thomas

ATTORNEYS

INVENTOR.
Richard R. Fink
BY Auslander + Thomas
ATTORNEYS

PATENTED SEP 5 1972　　　　　　　　　　　　　　3,689,014

INVENTOR.
Richard R. Fink
BY Auslander + Thomas
ATTORNEYS.

CAMMING STRAIN RELIEF BUSHING

This is a continuation-in-part application of U.S. Ser. No. 15,674 filed on Mar. 3, 1970.

The present invention relates to an improved camming strain relief bushing.

Strain relief devices are used to firmly hold an electrical conductor such as a standard electric cord in an aperture usually in a panel associated with an electrical appliance or other electrically operated device.

The strain relief bushings of the past, once engaged in the aperture with a wire leading through, have usually held themselves in the aperture and firmly gripped the electric cord so that any strain exerted on the cord would impinge at the bushing rather than at the point of connection of the electric cord where damage might occur.

The elements of strain relief bushings of the past have usually included some form of locking or self locking configuration adapted to grasp the panel walls surrounding the aperture, means for grasping the electric cord and means for localizing strain at the aperture.

Many means of the past such as grooves, flanges and resilient fingers have been employed, especially with tapered bushings to self lock such bushings when pushed through an aperture. In some instances strain relief bushings may even be bolted at an aperture.

Localizing the strain at the aperture has been effected by varying means such as the use of serrated split bushings carefully dimensioned to impinge upon the specific periphery of a cord so that the diminution of the channel of the bushing when engaged in an aperture grasps the cord localizing any strain at the aperture not at the point where the wire in the cord is attached. While bushings of this type can be effective, the amount of strain relief is usually limited to the simple grasping power of the serrations and minor variances in the bushing, cord or aperture dimensions may render the strain relief function of the bushing weak or ineffective.

One more complicated and expensive serrated strain relief device localizes strain by bolting a serrated collar at an aperture for proper grasp. Aside from the cost of the device itself, the use cost of such a device in labor time to bolt the cord or wire into position, makes strain relief by such means very expensive in combined material and labor cost.

Another form of strain relief of the past provides both strain localization and cord grasp by the interposition of a generally vertically moveable grip block in a recessed shank channel. The cord in the bushing is in effect forced into a somewhat U-shaped crimp. Thus, once a cord is engaged in the bushing and the bushing engaged in the aperture, the restraint is at the bushing in the aperture.

There are of course variants of such grip block strain reliefs, crimping a cord in effect and changing the direction of the cord in the bushing to provide strain relief and usually gripping at the bushing.

While such grip block strain reliefs of the past have provided efficiency and economy over the plain serrated or bolted strain relief, the grip block strain relief perforce must crimp the cord and does provide an element of danger of cracking or wearing the cord insulation and the conommitant danger of electrical short circuits. The point or points of impingement of the grip blocks also serves as a focal point for cord wear at the strain relief bushing with the ultimacy of short circuit danger or wire malfunction.

The problems of the serrated bushings and grip block bushings have not gone ignored. In fact, forms of wedging, moveable serrations or protrusions of sorts have been employed in complex or limited use strain relief bushings.

According to the present invention, a strain relief bushing is provided, employing aperture self-locking means of the past and the advantages of a longitudinal gripping block housed internal of the bushing, held within the bushing when in an aperture or otherwise locked. The bushing is further adapted to include a prelock before insertion into the aperture. The simple functional parts may further be held integral to each other by straps for further advantages in costs and costs of assembly.

When the shank portions of the bushing of the present invention are interlockable with an electric cord engaged inside and in contact with the gripping means, a cost factor in terms of labor saving adds new advantages to the bushing of the present invention since there can be no time loss from bushing part separation prior to placing the self locking of the bushing in the aperture or insertion is facilitated without need to resort to clamping tools to hold the bushing and cord assembly together for insertion into the aperture.

When the body or shank portions of the bushing and grippings means are joined by straps as a unit, further advantages are effected since problems of inventorying of the parts to complete the bushing are obviated and further, labor saving is at hand by the free manipulability of engagement of the gripping means, the cord and the locking of the assembly. Thus, the assembly is held together as a unit, avoiding the inconvenience of the assembly springing apart or the need for holding the assembly with clamping tools until the bushing is locked into the aperture.

One simple configuration of the cammed grip block allows a double camming action which tends to allow some play in the cord in the bushing without danger of disengaging the strain relief grasp. The double cam actually provides strain relief towards and away from the aperture with a gentle but firm grasp.

Another configuration of the present invention provides a selection of hinged wall portions of the shank, providing flexibility in the insertion of the strain relief bushings before they are locked in the panel. This flexibility is even not hindered when the grip block cams off the hinged wall. Thus, the camming effect is combined with a snap finger to cooperate with the flange in aperture locking. The double hinged walls may not only act as part of the locking mechanism, they also provide some inner flexibility within the bushing. All of this may be combined with a strap to hold a grip block having gripping means extending onto the strap portion which juxtaposes the grip block and which may extend behind the bushing when electric cord is in engaged in the bushing, gripping the cords throughout the shank and even beyond the shank end.

Although such novel feature or features believed to be characteristic of the invention are pointed out in the claims, the invention and the manner in which it may be carried out may be further understood by reference to the description following and accompanying drawings.

FIG. 1a–c is an exploded view of the embodiment of the strain relief bushing of the present invention.

FIG. 2a–c is a front elevation of the parts of FIG. 1a–c.

FIG. 3 is a bottom plan view of the shanked section of FIG. 1a.

FIG. 4b is a plan view of the grip block of FIG. 4a.

Referring now to the figures in greater detail, where like reference numbers denote like parts in the various figures.

Figure 1A:
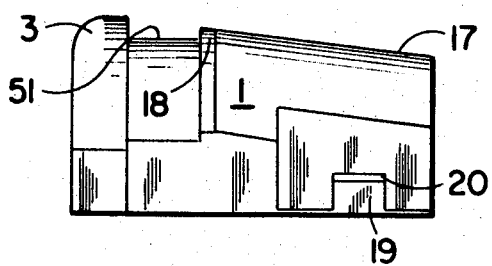
Figure 1B:
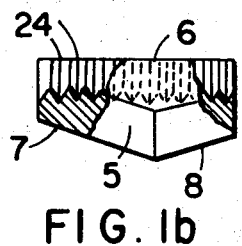
Figure 2B:
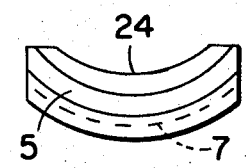
Figure 1C:
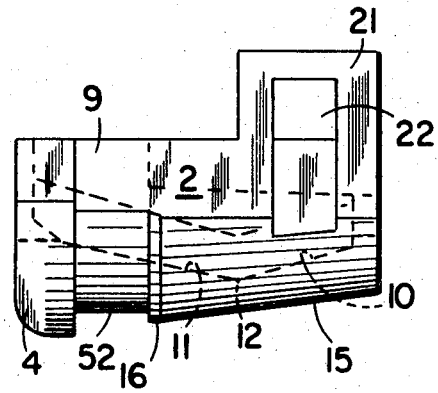
Figure 2C:
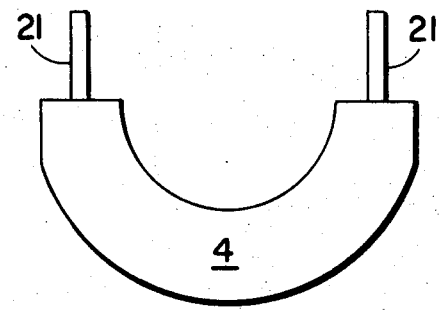
Figure 5:
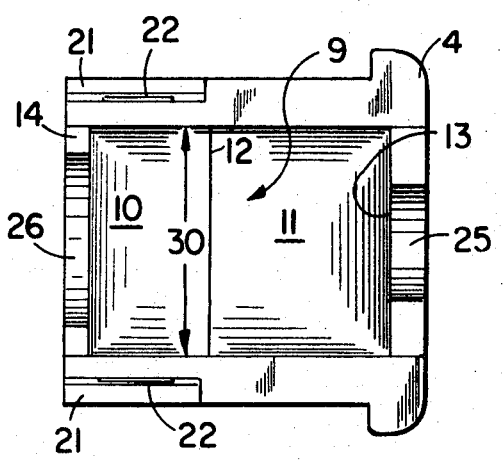
FIG. 5 is a plan view of the shank section of FIG. 1c.
Figure 6:
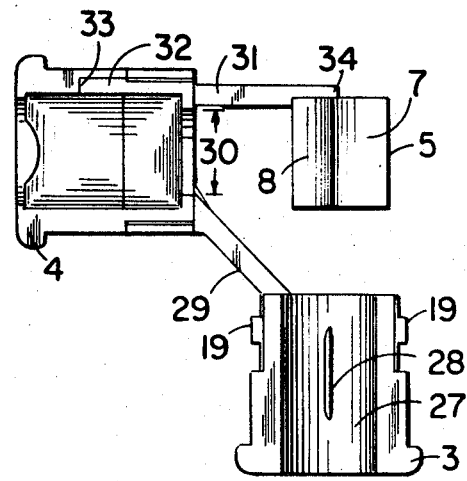
FIG. 6 is a plan view of another embodiment of the present invention.
Figure 7:
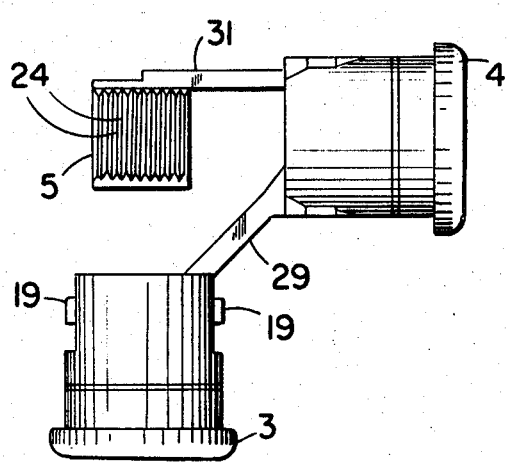
FIG. 7 is a bottom plan view of FIG. 6.
Figure 8:
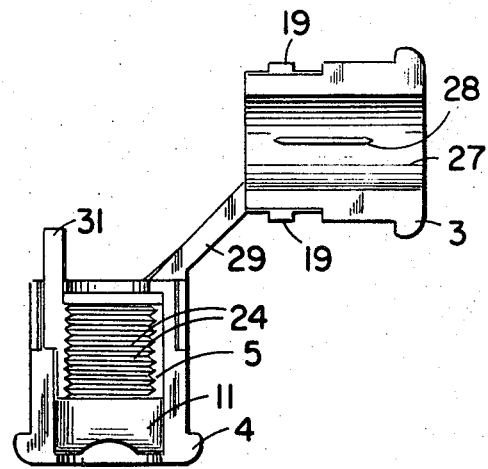
FIG. 8 is a plan view of FIG. 6 with the grip block in the recess.
Figure 9:
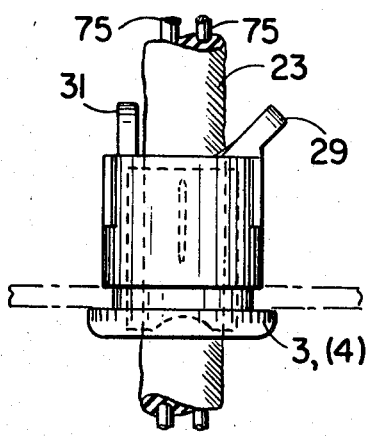
FIG. 9 is a plan view of the bushing of the present invention with an electric cord engaged.

The strain relief bushing as shown in FIG. 1 substantially comprises two shank sections 1, 2. The shank sections each include a flange portion 3, 4. A grip block 5 having a gripping surface 6 and two male camming portions 7, 8 fits into a recess 9 as can be seen in FIG. 5. The female camming portions 10, 11 are complementary to the male camming portion 7, 8 of the grip block 5. As shown, the cam portions 10, 11 slope upward from an apex 12, the longer camming portion 11 sloping upward toward the wall 13 near the shank flange 4. The female cam portion 10 is shorter and slopes upward from the apex 12 to the wall 14 which acts as a stop at the end of the shank section 2 opposite the flange portion 4.

The shank section 2 has a tapered peripheral ramp 15 which ends at a short taper 16. The ramp 15 and taper 16 have their complementary parts in a ramp 17 and a taper 18 on the other shank section 1.

A locking means to the shank is provided by studs 19, with slight tapered tips 20 which protrude from the sides of the shank section 1. The studs 19 are adapted to catch the ears 21 which may have a minute flare outward, at the ear openings 22.

The grip block 5 in the recess 9 has the male cam surface 7 and rests upon the female cam surface 11 and the male cam surface 8 rests upon the female cam surface 10. The grip block 5 is optionally contoured to receive the selected shape of a cord 23 as may better be seen in FIGS. 9, 10 and 11. As shown in FIGS. 1b and 6 through 11, the gripping surface 6 comprises a series of serrations 24 which provide a longitudinal grasping area along the gripping surface 6 to distribute impingement of the serrations 24 of the gripping surface 6, protectively along a cord.

The shank section 2 is provided with preferably contoured channel openings 25, 26 to substantially coincide with the grip block 5's gripping surface 6's contour.

Figure 2A:
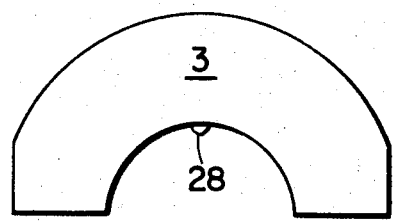
Figure 3:
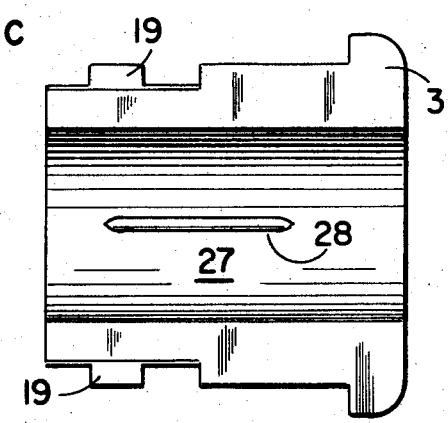

The other shank section 1 need only have a longitudinal channel portion 27 also contoured for the optional shape of the cord 23. A protrusion 28 is shown in FIGS. 2a and 3 longitudinally in the channel portion 27 to prevent rotation of a cord 23 once engaged in the locked bushing.

Figure 3A:
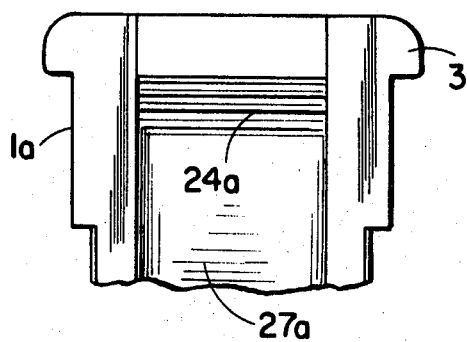
FIG. 3a is a variant of the shank section of FIG. 3.

In FIG. 3a a variant shank section is shown with serrations 24a along the channel portion 27a to serve as a further gripping means. The serrations 24 are formed so the selected periphery of the shank section 1a is the proper size for a selected cord 23.

In FIGS. 6 – 10 is shown a form of preferred embodiment of the bushing of the present invention. The shank sections 1, 2 are integrally joined by a strap 29 angulated away from the longitudinal axis width 30 of the channel portion defined by channel openings 25, 26 and the gripping surface 6 of the grip block 5 when set in the recess 9. The grip block 5 is held by a strap 31 which extends longitudinally back from the outside of the end wall 14 holding the grip block 5 with the camming surfaces 7, 8 upright. The straps 29, 31 are yieldable to fold the grip block 5 into the recess 9 with all camming surfaces 7, 8, 10, 11 engageable. A strap groove 32 provides a slide area for longitudinal play of the grip block 5 within the recess 9 when the bushing is assembled about a cord 23. The end 33 of the groove 32 also serves as a further stop against overmovement of the grip block 5 when the strap end 34 abuts 14.

Figure 14:
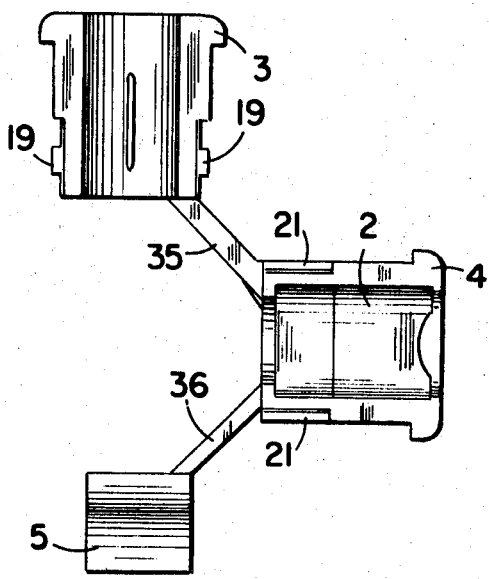
FIG. 14 is another embodiment of the present invention employing variant strap means.
Figure 15:
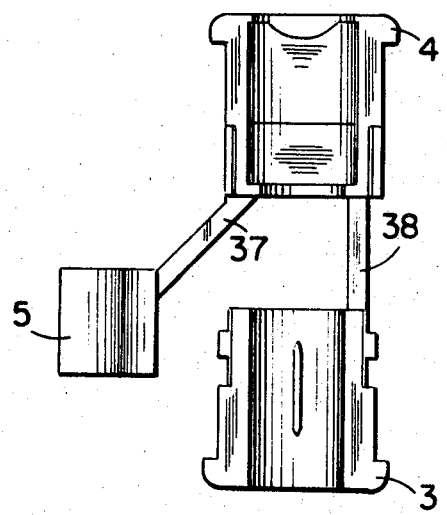
FIG. 15 is another embodiment of the present invention employing variant strap means.
Figure 16:
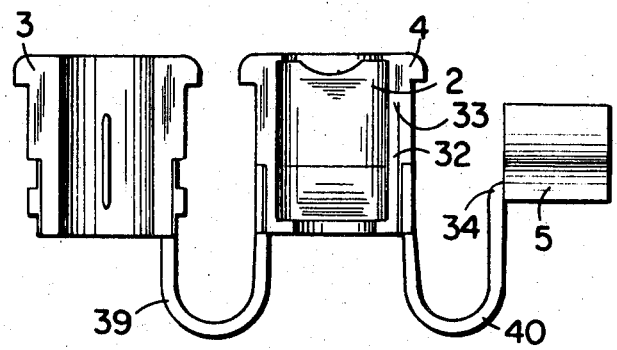
FIG. 16 is another embodiment of the present invention employing variant strap means.

FIGS. 14, 15 and 16 illustrate selection of optional strap configuration. In FIG. 14, the straps 35, 36 are both angled away from the longitudinal axis width 30 of the shank section 2. In FIG. 15 another optional configuration of straps 37, 38 are shown. In FIG. 16 the yieldable straps 39, 40 are away from the longitudinal axis width 30. The shank section 2 includes the groove 32, groove end 33 stop and strap end 34.

Figure 12:
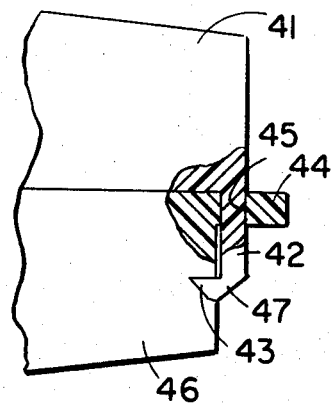
FIG. 12 is a partial view of the shank of the present invention showing a variant locking means.

Alternate shank locking means are shown in the detail FIG. 12 where one shank section 41 includes a detent 42 with a stud 43 which passes through an ear 44 having an opening 45. The ear 44 and opening are integral to the shank section which also includes a catch 47 to catch the detent 42, stud 43.

Figure 13:
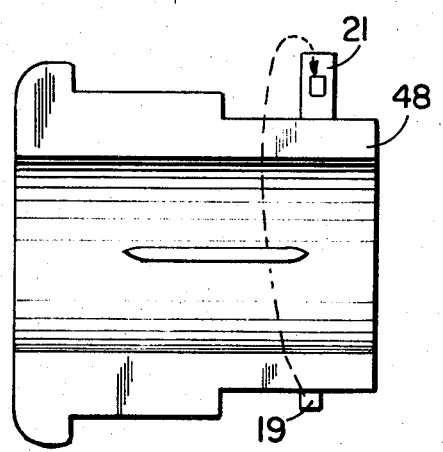
FIG. 13 is a partial plan view of a shank action including a variant locking means.

In FIG. 13 a shank section 48 illustrates an alternate ear 21 and stud 19 to mate a reciprocal combination on another shank section (not shown).

Figure 10:
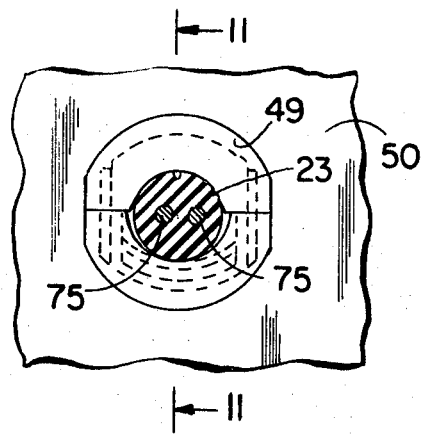
FIG. 10 is a front elevation of FIG. 9.
Figure 11:
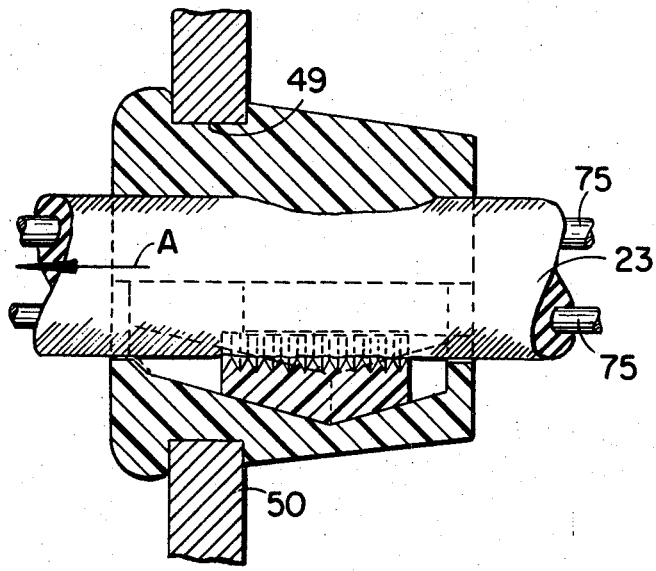
FIG. 11 is a partial section of FIG. 10 at lines 11—11.

The bushings of the present invention self lock in an aperture 49 in a panel 50 as shown in FIGS. 10 and 11.

The bushing section's locking into the aperture 49 is effected as can be seen in the bushing of FIG. 1, where the sections 1, 2 are juxtaposed and inserted into an aperture. The bushing rides into the aperture 49 along the ramp surfaces 17, 15, then off the tapers 16, 18 and into the grooves 51, 52, grasping the panel 50 by the cooperation of the flange sections 3, 4 and the walls of the grooves 51, 52.

FIGS. 17 through 20 illustrate variant forms of cooperative locking between a flange section on a shank section and a grasping means.

Figure 17:
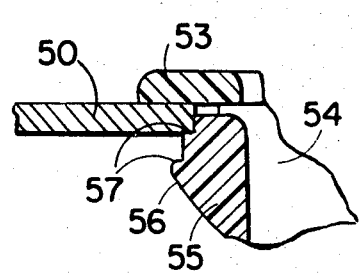
FIGS. 17 to 20 are variant forms of cooperative locking between a flange section on a shank section and a grasping means.

In FIG. 17 the flange section 53 on the shank section 54 locks with a resilient finger 55 having a ramp 56 and a series of stepped shoulders 57, the finger 55 extending from the body of the shank section 54.

Figure 18:
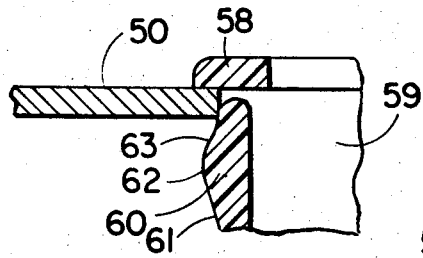

In FIG. 18 the flange section 58 on a shank section 59 is a resilient finger 60 extending from the body of the shank section 59. In insertion into the aperture 49, the panel 50 rides the ramp section 61 past its apex 62 down the ramp section 63, the resilience of the finger 60 holds the panel 50 firmly in cooperation with the flange section 50 and ramp 63 on the finger 60.

Figure 19:
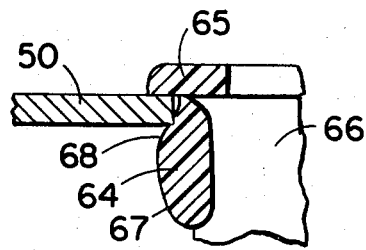

In FIG. 19 the holding of the panel 50 is effected very much as in FIG. 18 except the finger depends resiliently from the flange section 65 on the shank section 66. The finger 64 has two ramps 67, 68.

Figure 20:
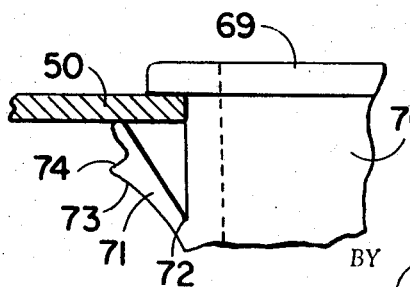

In FIG. 20 the flange section 69 integral to the shank section 70 holds a panel 50 by the spring of a finger 71 extending from a hinge 77. A selection of panel 50 thicknesses may be grasped between the flange section 69 and the end of the finger as shown, or a greater width of panel could ride the ramp 73 and catch the thicker panel between the shoulder 74, and the flange section 69.

Figure 21:
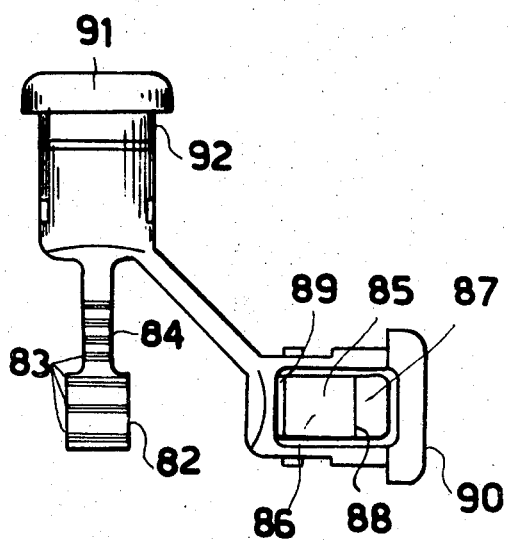
FIG. 21 is another embodiment of the strain relief bushing of the present invention with a hinged camming shank wall and gripping strap.

In FIG. 21, the grip block 82 has protruding grips 83 which extend onto the strap 84, which holds the grip block 82. The shank wall 85 includes a ramp portion 86 and a finger 87 inset from the ramp. Finger 87 is recessed from the shoulder 88. The shank wall 85 pivots on the hinge 89. Thus, a closed bushing may be pushed in the aperture of the ramp 85 and engage itself between the flanges 90, 91, the groove 92 and the shoulder 88.

In use, as is shown in the illustrative example in FIGS. 8 through 11, the grip block 5 is folded into the recess 9 with the gripping surface 6 facing internal of the channel formed by the shank selections 1, 2, a cord 23 usually with wires 75, fits in the half channel of the grip block and channel openings 25, 26. The shank section 1 normally folds along a bending axis to engage the ears 21 to intersect and catch the studs 19 in the ear opening 22, catch locking the shank section 1, 2 against snapping apart or sliding even while not in an aperture 49.

The cord and bushing assembly thus locked, holds together and need only be entered into the aperture 49 where the ramps 15, 17 present a periphery smaller than the aperture 49, thus, by simple pushing and the resilience of the bushing itself, the assembly engages the panel 50 between the flange sections 3, 4 and the grooves 51, 52. The periphery of the flange sections 3, 4 is larger than the aperture as well as the periphery of the groove 51, 52 walls, thus the bushing and cord 23 are self locked into the aperture 49 with the bushing having only the flange portion 3, 4 catching on one side of the aperture.

In FIG. 11, the grasping action of the bushing is illustrated in section.

A cord statically held in a bushing in an aperture 49 passes through the channel openings 25, 26 and the channel portion of the shank sections 1, 2. The serrations 24 act as a grasp means. When a strain is imposed on the cord 23 in direction A, the grip block 5 moves with the cord with male and female surfaces 7, 11 narrowing the periphery of the channel of the locked bushing. The channel is in effect a tube. The greater the strain, the greater the camming action and the greater the grasp on the cord 23.

The grip block 5 has play in the recess and without crimping, the cord 23 may allow it to resume a normal position when not under strain. The male and female surfaces 8, 10 prevent cord 23 slippage in the bushing and further, act as a strain relief from the opposite side of the panel. While the protrusion 28 acts to grasp as well as to prevent rotation of the cord 23, a shank section 1a with serrations 24a in the channel portion 27 could be used as a variant to the shank section 1 for greater gripping surface impingement on the cord 23.

Substantially, the bushing of the present invention comprises a shank section 1 including a flange portion 3, a channel portion 27, a locking stud 19 and a protrusion 28 longitudinally along the channel 27, a ramp 17 to a groove 51 to engage the shank section 1 when locked within an aperture 49; the shank section 2 is provided with a recess 9 having female camming surfaces 10, 11 which narrow the periphery of the channel portion internal of the shank section 2. The shank section 2 has channel openings 25, 26 at the flange 4 end and at the opposite end. The channel openings 25, 26 are in walls 14, 15 which serve as stops for the grip block 5. The shank section 2 includes ears 21 with openings 22 which flex to snap lock with the studs 19 of the shank section 1. Internal of the recess fits a grip block 5 having male camming surfaces 7, 8 and a gripping surface 6 generally contoured to the shape of the channel opening 25, 26 to accept a cord 23 through the tubular configuration of the locked bushing with the grip block 5, the grasping means on the grip block 5 are serrations 24 which provide a longitudinally distributed grip on the cord 23. The grip block 5 has play in the recess 9 to cam with the movement of the cord 23 either forward or backward to grasp more tightly the greater the strain on the cord 23. The protrusion 28 in the channel 27 holds the cord 23 against rotation. The shank section 2 and grip block 5 are held by a strap 31 yieldable on a bending axis to foldably engage the grip block 5 into the recess 9. Preferably, the grip block is extended from the outside of the wall 26 of the shank section 2 with its gripping surface 6 faced away from its gripping position in the recess 9. When a cord 23 is set through the channel portions formed by the shank sections, the gripping surface 6 of the grip block 5 holds the cord 23 locked together as a single unit. The strap 29 holds the shank section 1 yieldable on a bending axis to foldably engage shank section 2 and lock therewith. Although the grip block 5 may be held by the strap 31 as an integral part of the bushing, the grip block 5 is functionally separate from the shank 1, 2.

The configuration as described is ideal to avoid the time and labor of searching for matching bushing parts, easily manipulatable to fold the grip block 5 into the recess 9, place a cord in the shank section 2 and swing over the shank section 1 and lock the assembly so that it does not have to be held by tools until it is ready to be inserted into the aperture 49. The strain relief bushing has an automatic aperture 49 locking means; thus, with ease not heretofore available, assembly and insertion with strain relief security are provided by the play of a cammed grip block 5 camming to greater grasp with cord strain in either direction. The grip block 5 protects cord 23 and wire 75 from crimping and protects the insulation of the cord 23 by its longitudinal configuration. The strain relief bushing, while having many elements used in prior bushings, employs in one bushing assembly, advantage over prior elements as formerly used.

Figure 4:
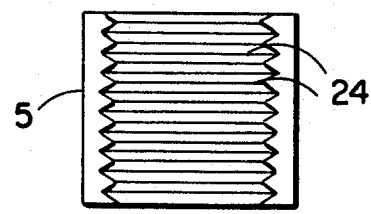
FIG. 4 is a plan view of the grip block of FIG. 1b.
Figure 4A:
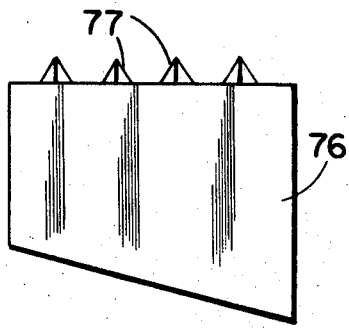
FIG. 4a is a variant grip block.
Figure 4B:
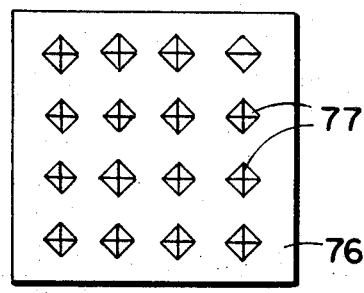
Figure 4C:
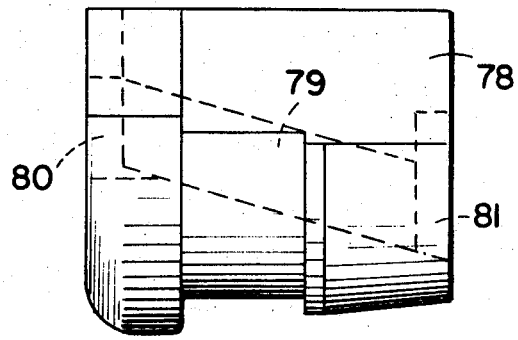
FIG. 4c is a variant shank section to hold the grip block of FIG. 4a and b.

The grip block 76 as shown in FIG. 4a includes a series of protrusions 77. The grip block 76 is optionally contoured for the cord 23 that it is adapted to grasp. As can be seen in FIG. 4b, the protrusion 77 rises from a plane upper surface of the grip block 76. In FIG. 4c a shank section 78 is shown adapted to hold the grip block 76 inescapably within its recess 79 between its front wall 80 and back wall 81 when a bushing of the present invention is locked in an aperture 49 or the shank sections are locked with a proper sized cord 23 in a channel formed by the two shank sections and the grip blocks 5, 76.

Figure 22:
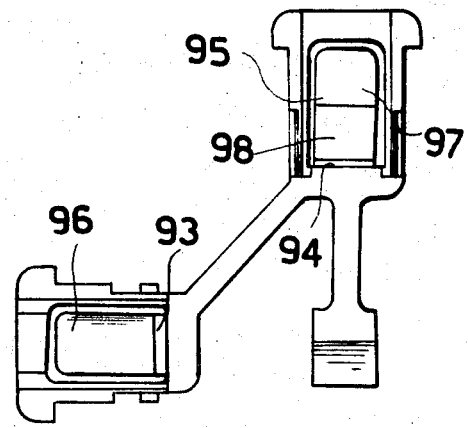
FIG. 22 is another embodiment of the invention of FIG. 21 having two hinged shank walls.
Figure 23:
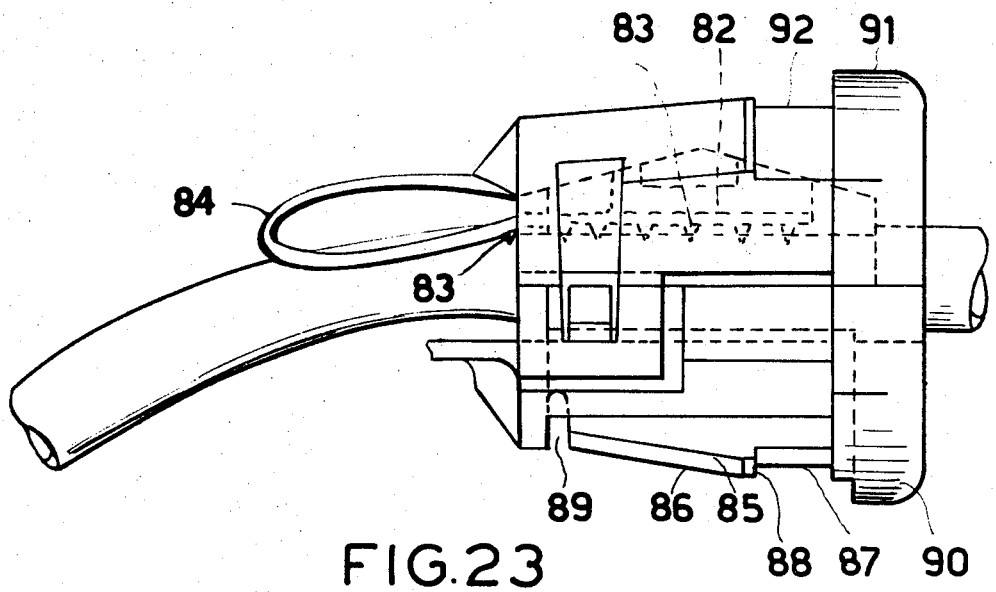
FIG. 23 shows the strain relief bushing of FIG. 21 engaging an electric cord.

The strain relief bushings of FIGS. 21 through 23 include all the advantages of the present invention, and yet have the additional benefits of an integral locking means in the shank walls 85, 95, 96, such as in the prior art. The camming of the grip block along the female cam portions 97, 98, as can be seen in FIG. 22, does not affect the other characteristics of the bushing and may actually provide greater flexibility against rupture. The additional gripping by the protruding grips 83 along the strap 84, helps improve both grip and strain relief capabilities in the present invention.

The terms and expressions which are employed are used as terms of description; it is recognized, though, that various modifications are possible.

Having thus described certain forms of the invention in some detail, what is claimed is:

1. A strain relief bushing for retaining a cord in an aperture said strain relief bushing comprising an outer shank portion, said shank portion comprising at least two sections said shank portion including a flange portion at one end of said shank portion, said flange of greater periphery than said aperture, said flange portion of said shank having only a small protrusion beyond said aperture, aperture locking cooperating means, said aperture locking cooperating means adapted to lock said shank in said aperture in cooperation with said flange, a channel through said shank portion, at least one portion of said channel being recessed adapted to receive a grip block, said recess including camming means depressing the channel periphery at least toward the flange end of said shank portion, a grip block, said grip block functionally separate from said shank, said grip block adapted to cam along said camming means, said grip block adapted to have some longitudinal play in said recess, and said grip block in said recess in said channel adapted to cooperate with said cord and graspingly cam against said cord as said cord is moved at least in the direction of said flange, stop means integral of said bushing, said stop means adapted to limit said grip block's longitudinal play and retain said grip block within said channel when said shank sections are juxtaposed with said cord in said channel.

2. The invention of claim 1 wherein said shank sections include catch locking means, said locking means adapted to lock said shank sections in juxtaposition against opening or sliding.

3. The invention of claim 2 wherein said locking means include interacting ears and studs.

4. The invention of claim 2 wherein said locking means include a pair of ears on one shank section and a pair of studs on said other shank section.

5. The invention of claim 2 wherein locking means are at the end of said shank sections opposite said flange.

6. The invention of claim 2 wherein locking means include at least one detent including a stud on one shank section and at least one catch on said other shank section.

7. The invention of claim 6 wherein said locking means are at the end of the shank sections opposite said flange.

8. The invention of claim 7 wherein said detent is surrounded by an ear when locked.

9. The invention of claim 2 wherein one portion of said channel is substantially a half tube.

10. The invention of claim 9 including means adapted to prevent rotary movement of said cord.

11. The invention of claim 10 wherein said rotary movement prevention means is a longitudinal protrusion.

12. The invention of claim 9 wherein said tubular portion of said channel includes grasping means.

13. The invention of claim 12 wherein said grasping means are serrations.

14. The invention of claim 2 wherein said camming means are also adapted to cams toward said shank and opposite said flange end.

15. The invention of claim 2 wherein said grip block is serrated.

16. The invention of claim 2 wherein said grip block portion in said recess has a substantially male configuration of the female recess of said shank portion.

17. The invention of claim 14 wherein said grip block portion has a substantially male configuration of said channel female recess.

18. The invention of claim 2 wherein said shank sections are integrally joined by strap means, said strap means yieldable to move to juxtapose said shank sections in locked position.

19. The invention of claim 2 wherein said shank sections are integrally joined by strap means, said strap means yieldable to move to juxtapose said shank sections in locked position and strap means adapted to integrally join said grip block said strap means yieldable to engage said grip block in said recess.

20. The invention of claim 19 wherein said grip block strap extends from the end of a shank section opposite said flange.

21. The invention as claimed in claim 20 wherein said grip block strap means extends from a shank section including a channel recess.

22. The invention of claim 19 wherein said grip block strap includes a normal bending axis adapted to fold said grip block with said grip block camming means juxtaposed to said recess camming means.

23. The invention of claim 19 wherein said grip block strap includes a normal bending axis adapted to fold said grip block with said grip block camming means juxtaposed to said recess camming means and said strap to said other shank section extends from said same shank section as said grip block extends from.

24. The invention of claim 23 wherein said shank section strap includes a normal bending axis adapted to fold said shank sections for normal locking engagement.

25. The invention of claim 23 wherein said grip block strap means and shank strap means hold said grip block and shank section beyond an axis along the longitudinal axis of the width of said shank section from which said strap means extend.

26. The invention of claim 1 wherein said aperture cooperation locking means by said flange is a groove in said shank.

27. The invention of claim 1 wherein said aperture cooperation locking means by said flange is at least one resilient finger.

28. The invention of claim 27 wherein said finger includes at least one shoulder.

29. The invention of claim 27 wherein said finger extends from said shank.

30. The invention of claim 27 wherein said finger extends from said flange.

31. The invention of claim 1 wherein said flange cooperating locking means is at least one hinged finger extending from said shank.

32. The invention of claim 31 wherein at least one of said fingers includes at least one shoulder.

33. The invention of claim 2 wherein said aperture cooperation locking means by said flange is a groove in said shank.

34. The invention of claim 2 wherein said aperture cooperation locking means by said flange is at least one resilient finger.

35. The invention of claim 33 wherein said finger includes at least one shoulder.

36. The invention of claim 33 wherein said finger extends from said shank.

37. The invention of claim 35 wherein said finger extends from said flange.

38. The invention of claim 2 wherein said flange cooperating locking means is at least one hinged finger extending from said shank.

39. The invention of claim 38 wherein at least one of said fingers includes at least one shoulder.

40. The invention of claim 2 wherein said grip block includes protrusions.

41. The invention of claim 19 wherein said aperture locking cooperating means in said shank includes at least one portion in said shank wall integral to said shank section at one end.

42. The invention of claim 41 wherein said flexible portion is integrally joined to said shank by hinge means.

43. The invention of claim 42 wherein said hinge means face inward of said shank.

44. The invention of claim 42 wherein such hinge means face outward of said shank.

45. The invention of claim 19 wherein said grip block strap includes gripping means.

46. The invention of claim 22 wherein said grip block strap includes gripping means.

* * * * *